CURT KUENTZEL
INVENTOR

C. KUENTZEL.
TIRE MAKING MACHINE.
APPLICATION FILED DEC. 14, 1918.

1,364,386.

Patented Jan. 4, 1921.
2 SHEETS—SHEET 2.

CURT KUENTZEL
INVENTOR
BY Wm E Dyre
ATTORNEY

UNITED STATES PATENT OFFICE.

CURT KUENTZEL, OF AKRON, OHIO, ASSIGNOR TO THE AKRON RUBBER MOLD & MACHINE COMPANY, OF AKRON, OHIO, A CORPORATION OF OHIO.

TIRE-MAKING MACHINE.

1,364,386.  Specification of Letters Patent.  Patented Jan. 4, 1921.

Application filed December 14, 1918. Serial No. 266,741.

*To all whom it may concern:*

Be it known that I, CURT KUENTZEL, a citizen of the United States, residing at Akron, in the county of Summit and State of Ohio, have invented certain new and useful Improvements in Tire-Making Machines; and I do hereby declare the following to be a full, clear, and exact description of the invention, such as will enable others skilled in the art to which it appertains to make and use the same.

This invention relates to certain new and useful improvements in tire making machines, and contemplates more especially an improved device for use in the production of solid tires for trucks and other heavy vehicles.

An object of the present invention is the production of a mobile mechanism upon which a tire can be quickly built up in close proximity to the usual calendering rolls from which suitably compounded rubber is received.

Another object of this invention is the production of a tire building mechanism including a portable carriage or carriages, several of which may be readily attached to the calendering machine at the same time when desired for producing tires varying in size according to the widths of the material as cut and fed from the calendering rolls.

A further object of the invention is the production of a portable solid-tire-building carriage upon which the tire rim or base is revolubly supported in frictional contact with one of the calendering rolls, for winding the material upon said rim or base.

A still further object of the invention is the production of a solid tire building mechanism including a movable carriage having a tire supporting roller, a guide for the rim or metallic base upon which the tire is to be built up, and means comprising a pivotally mounted pressure roller for compressing the material after being applied to the tire rim or base while still warm and somewhat tacky.

With these and other objects in view, the invention further consists in the combination and arrangement of the several parts hereinafter more particularly described and finally pointed out in the appended claims.

In the accompanying drawings, which show by way of illustration an embodiment of my invention, Figure 1 is a front view in elevation, showing a plurality of my improved tire-building mechanisms applied to a calendering machine.

Figure 2:
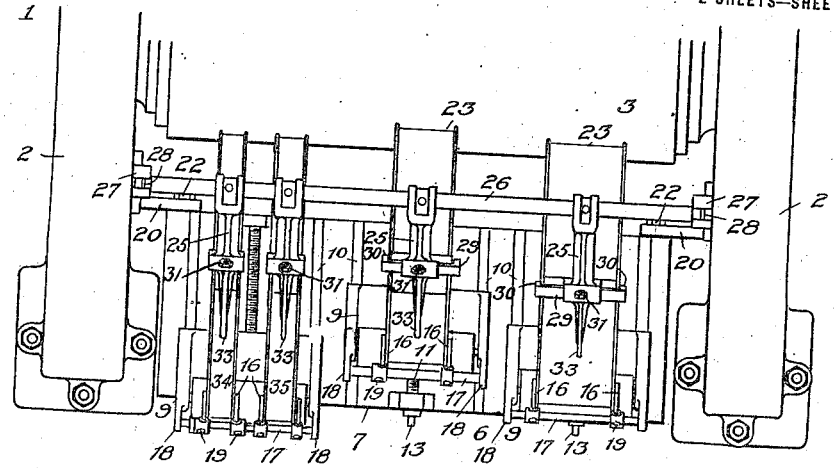
Fig. 2 is a top plan view thereof.

In the manufacture of rubber tires at the present time certain difficulties are experienced in applying the sheeted and cut stock to the base-rims or frames upon which the tires are built. In practice, these rims or frames are usually supported by means separate and apart from the calendering rolls, and are therefore complicated by the presence of independent revolving or driving mechanisms. Moreover, the calendered sheeted stock is then applied to the rim base or frame in a comparatively cold state which necessitates the use of cements and expensive rubber solutions. This method has been found to be more or less unsatisfactory and various attempts have been made to bring the tire building rim or frames in closer proximity to the calendering rolls during the operation of tire building. These attempts have been attended with certain manufacturing difficulties which the present invention has to a large extent overcome, including release of the calendering machine for use in connection with the manufacture of other rubber products when not employed in the production of tires.

Reference being had to the drawings forming part of this application for Letters Patent, and to the numerals thereon which indicate like parts in the several views: 1 indicates the usual calendering machine having supporting housings 2, rolls 3, 4 and 5, and a detachable tire building carriage 6 portably adjustable with relation to the calender.

The calender rolls may be of ordinary construction such as is now used for the sheeting of stock in the production of various kinds of rubber products.

The tire building carriage 6 is of novel construction and includes among other things a truck body 7 suitably mounted upon wheels 8. Adjustably positioned upon the truck body 7 are a plurality of tire rim or frame supports 9 each of which is slidingly mounted in dove-tail or similar guides 10, provided upon the top side of said truck body. Each support 9 is adjustably movable by means of the screw 11 relatively positioned and secured to said truck body 7 and support 9, and rotatably controlled by means of a crank 12 adapted to engage the reduced end 13 of each screw 11. By this construction it will be seen that each support 9 can be independently adjusted toward or away from the calendering rolls, as will more fully hereinafter appear.

The tire rim or frame supports 9 are each provided with a roller 14 suitably mounted in bearings 15 extending from the body portion of each support. The roller 14 is revolubly mounted in said bearings, which may be of roller or ball type, and serves to support the rim or frame upon which the tire is to be built up, in conjunction with the lower calendar roll 5, as clearly shown in Fig. 3.

Suitable guide fingers 16 are provided for engaging the side flanges of the rims or frames. These guide fingers 16 are adjustably mounted upon a bar 17 secured in the extensions 18 of bearings 15. Set screws 19 hold the guide fingers in place.

Figure 3:
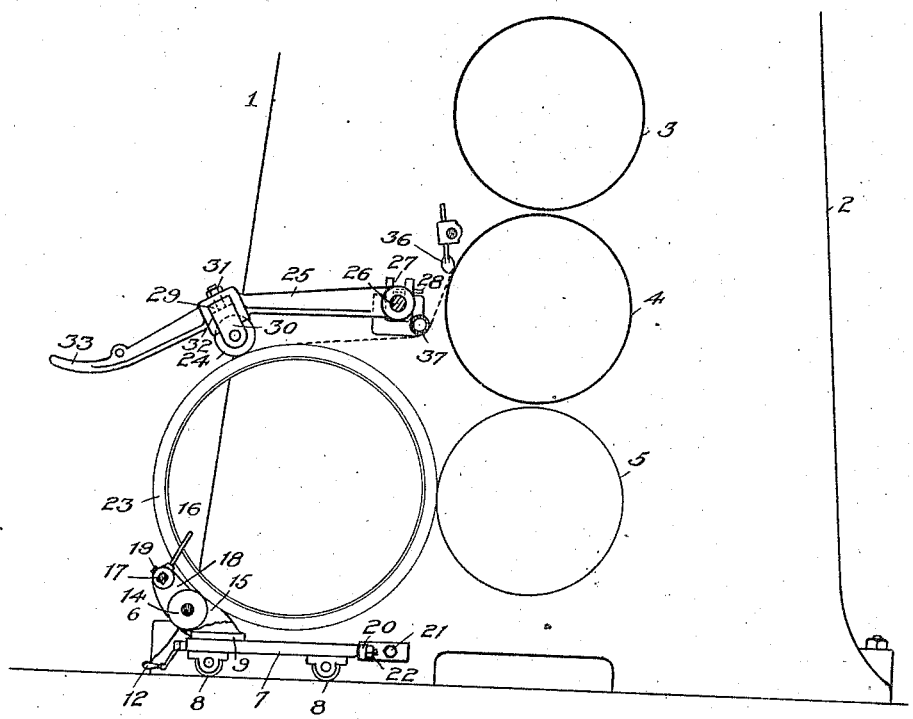
Fig. 3 is a view in vertical sectional elevation showing a tire rim or base revolubly supported in operative position between the tire building carriage and the lowermost calendering roll.

The means for detachably associating the tire building carriage 6 with the calendering machine includes a bar 20 secured by bolts 21 to the inner faces of the calender housings 2. This bar preferably extends across the calender and is designed to have secured thereto the tire building carriage aforesaid. Bolts 22 serve to attach the said carriages 6 to the bar 20, as best shown by Fig. 3.

In practice, the rim or frame 23 upon which the tire is to be built up is positioned between the supporting roller 14 and the lower calender roll 5, from which latter it receives rotary motion for purposes of winding the sheeted and cut stock as it is fed from the calender rolls.

The mechanism for compressing the sheeted material upon the rim or frame during the winding process comprises a pressure roller 24 freely mounted in a lever 25 pivotally supported from a cross shaft or bar 26. The bar 26 is removably mounted in opposite U-shaped bearings 27, and is held in place by pin 28, see Figs. 2 and 3. The bar 26 extends across the calender and supports several pressure rollers 24, corresponding in number to the several tires in the process of building.

Various size pressure rollers 24 may be substituted in the levers 25, and the means for obtaining this adjustment comprises yokes or blocks 29 of different widths, having bearing arms 30. The yokes or blocks 29 are secured in the levers 25 by means of screw bolts 31. As shown, the blocks 29 are fitted within recesses 32 formed in the under side of the levers 25. In this way yokes and blocks designed to accommodate pressure rollers of various widths may be readily positioned. An operating end or handle 33 is provided on each lever 25 as the means of regulating pressure, but while I have shown this method of compressing of the sheeted stock upon the frame, it will be understood that various other means may be employed for accomplishing the same or similar results, either automatic or manually controlled.

Figure 1:
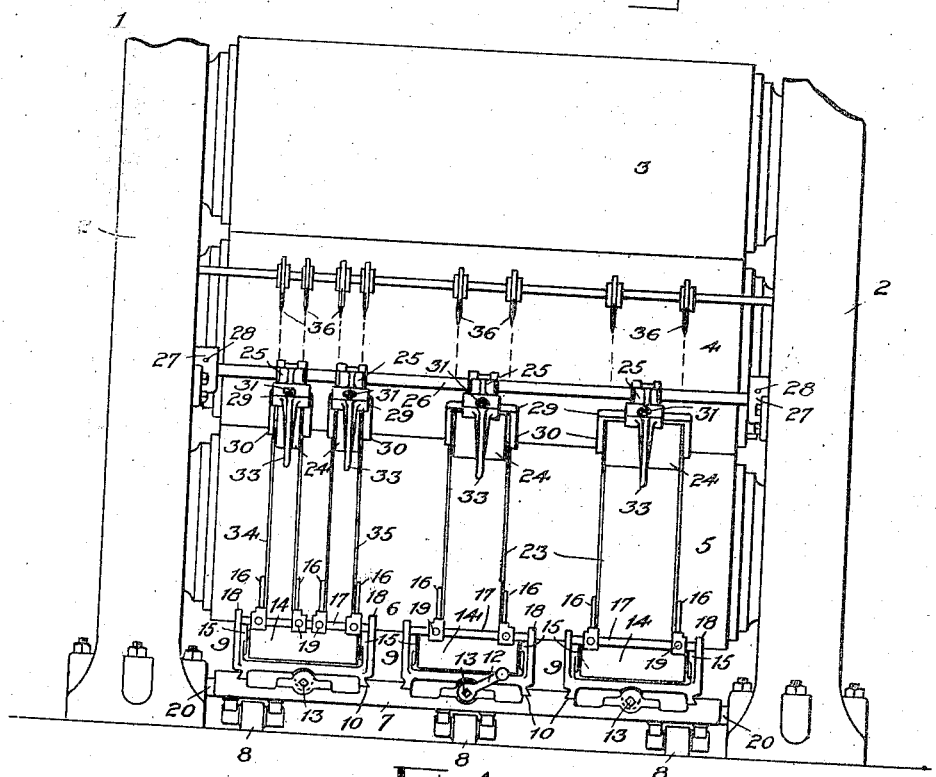

In operation, the bar 26 carrying the levers 25 is inserted in the U-shaped bearings 27 and fastened by means of pins 28, then the tire building carriage 6 is moved into position adjacent the frame of the calendering machine, there being detachably bolted in place to the bar 20. Several tire rims or frames upon which the tires are to be built are now selected. These may vary in width and diameter according to requirements. The supports 9 carrying the rollers 14 are now adjusted through the manipulation of screws 11 until each tire frame is properly positioned and supported between the said roller 14 and the lower calender roll 5, as best shown by Fig. 3 of the drawings. The guide fingers 16 are now adjusted so as to bear upon the said frames and retain the same in revoluble alinement during the winding and forming operation. The positions of these fingers are determined by the width of the tire frame inserted, various sizes of tire frames being illustrated in Figs. 1 and 2. By the interposition of a second set of guide fingers, two or more tires may be formed upon a single support 9, as indicated at 34 and 35.

The material is fed under a cross bar or guide 37 which is a part of every calender in sheeted form from the calendering rolls and cut into proper widths by means of the usual knives or cutters 36. As shown in Fig. 3, the material indicated by the dotted lines is fed under a cross rod or guide 37. The rotary motion imparted to each tire rim or frame by its contact with the calendar roll and its antifrictional support results in uniformly winding the aforesaid calendered stock during the operation of tire building.

During this winding process the pressure roller 24 is operated so as to compress the stock firmly against the tire rim or frame, into a uniform, homogeneous body.

After completion of the building operation, the bar 26 is detached, and the tire rims or frames are removed to be further treated in the usual manner. It will also be apparent that the tire building carriage 6 may now be readily detached by unfastening bolts 22, and the calender rendered free for the formation of such other rubber products as may be desired.

From the foregoing it will be obvious that I have produced a tire building mechanism of extremely simple construction, of great commercial adaptability for general factory uses, including tire building, and at the same time an unusually efficient and economical invention.

Having thus described my improvements, what I now claim and desire to secure by Letters Patent is:

1. In a machine for forming tires, the combination with superimposed calendering rolls, of a portable tire-building carriage, means for revolubly supporting a tire in course of construction between the lowermost of said rolls and said carriage, and means for guiding the calendered material from another of said rolls.

2. In a machine for forming tires, the combination with calendering rolls, of a detachable tire building carriage, a framebase for said tire interposed between the intermediate calendering roll and the tire-building carriage, for receiving the calendered material direct from said intermediate roll and means including frictional contact of said frame with another adjacent calendering roll for imparting motion to said frame.

3. In a machine for forming tires, the combination with calendering rolls of a tire building frame in frictional contact with one said roll for rotating the said frame, means for feeding the calendered material from another of said rolls and means for exerting a pressure upon the material forming the tire on said frame during the forming thereof and at a point in close proximity to the calender roll from which the material is fed.

4. A machine for forming tires comprising a calender, a tire-building frame upon which the tire is formed, and a detachable carriage between which and the calender the tire frame is supported, said detachable carriage comprising a movable anti-frictional support for the aforesaid tire frame, and guides for maintaining the frame in position.

5. A machine for forming tires comprising a calender, a tire-building frame upon which the tire is formed, and a detachable carriage between which and the calender the tire frame is supported, said detachable carriage comprising an adjustable support including an antifriction roller, upon which the tire frame is mounted, and a series of adjustable guides for maintaining the tire frame in position.

6. In a machine for forming tires the combination with calendering rolls of a portable tire-building frame, means for supporting said frame in frictional contact with one of said calender rolls, and means including a lever and pressure roller carried thereby for exerting pressure upon the tire while being formed.

7. In a machine for forming tires, the combination with calendering rolls of a tire-building frame, means including a portable carriage detachably associated with said calendering rolls, means for freely supporting the periphery of the tire building frame between said carriage and one of the calendering rolls, means for guiding the calendered material from one of said rolls, means for revolving said tire frame, and means including a pressure roller for exerting pressure upon the tire during the forming thereof at a point in close proximity to where the calendered material leaves the said calendered roll.

8. In a machine for forming tires, the combination with calendering rolls of a tire-building frame, means for revolubly supporting said frame, means for feeding the calendered material from one of said rolls over the said frame and means for exerting pressure upon said tire material while being fed at a point where it passes over said frame, said means comprising a detachable support, a lever pivoted to said support, and a roller carried by said lever for contacting with the tire being formed.

9. In a machine for forming tires, the combination with calendering rolls of a tire-building frame, means for revolubly supporting said frame, and means for exerting pressure upon said tire while being formed, said means comprising a detachable support, means including pins for retaining the same, an adjustable lever pivoted to said support, and a roller carried by said lever for contacting with the tire being formed.

10. In a machine for forming tires, the combination with calendering rolls of a tire-building frame, means for revolubly supporting said frame, and means for exerting pressure upon said tire while being formed, said means comprising a detachable support, a lever pivoted to said support having a recess therein, a bearing block secured in said recess, and a roller carried by said block for contacting with the tire being formed.

11. A tire-building device including in combination a wheeled carriage, a tire support mounted on said carriage, means including a screw for adjustably positioning said support upon the carriage, a roller provided on said support, and a series of guides in close proximity to said roller.

12. A tire building device including in combination a wheeled carriage, a tire support mounted on said carriage, means for adjustably positioning said support upon said carriage, and adjustable guide devices arranged in close proximity to the tire support.

In testimony whereof I affix my signature, in presence of two subscribing witnesses.

CURT KUENTZEL.

Witnesses:
W. E. WILSON,
S. W. HARRIS.